(No Model.)

J. H. BETHUNE.
COTTON CHOPPER.

No. 251,820. Patented Jan. 3, 1882.

WITNESSES:
Francis McArdle
C. Sedgwick

INVENTOR:
J. H. Bethune
BY Munn & Co
ATTORNEYS.

United States Patent Office.

JOHN H. BETHUNE, OF FAYETTEVILLE, NORTH CAROLINA.

COTTON-CHOPPER.

SPECIFICATION forming part of Letters Patent No. 251,820, dated January 3, 1882.

Application filed July 23, 1881. (No model.)

*To all whom it may concern:*

Be it known that I, JOHN HECTOR BETHUNE, of Fayetteville, in the county of Cumberland and State of North Carolina, have invented a new and useful Improvement in Cotton-Choppers, of which the following is a full, clear, and exact description.

Figure 1:
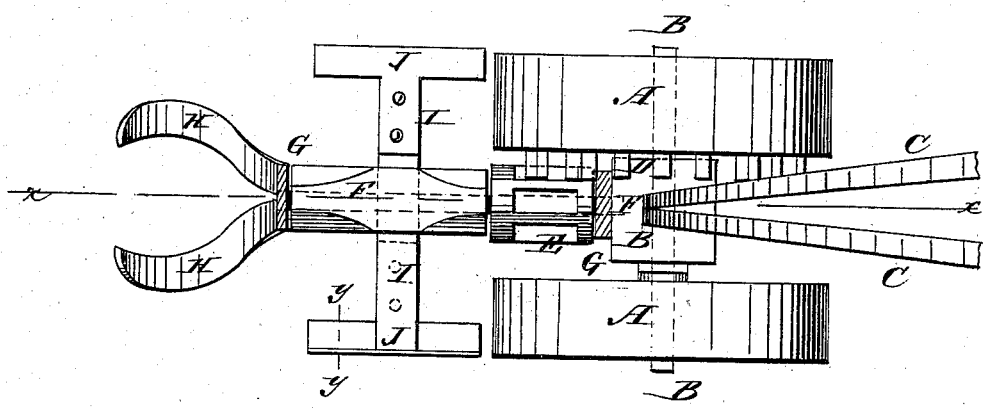
Figure 3:
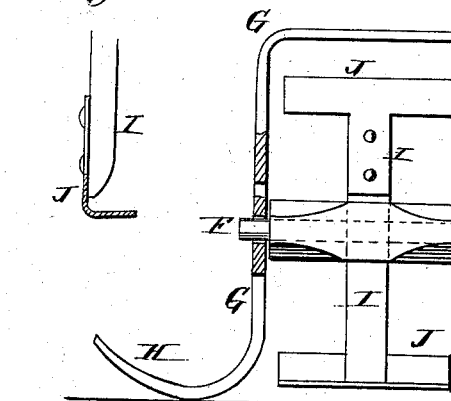
Figure 2:
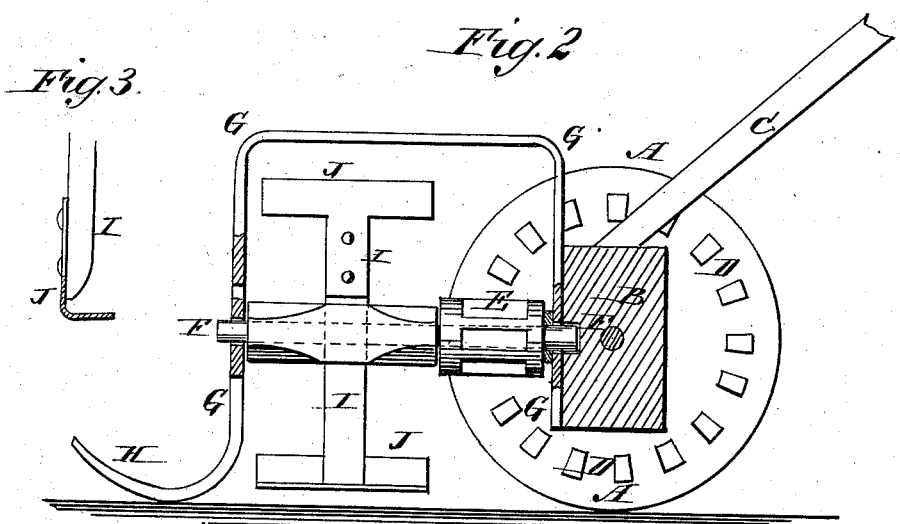

In the accompanying drawings, Figure 1 is a plan view, partly in section, of my improvement. Fig. 2 is a sectional side elevation of the same, taken through the line $x$ $x$, Fig. 1. Fig. 3 is a cross-section of one of the chopping-hoes, taken through the line $y$ $y$, Fig. 1.

Similar letters of reference indicate corresponding parts.

The object of this invention is to facilitate the chopping of cotton to a stand.

The invention consists in a cotton-chopper constructed with wheels, axle, and handles, a pair of gear-wheels connected with one of the drive-wheels, an arched bar attached at one end to the axle and having guard-runners upon its other end, and the radial arms having angular chopping-hoes attached to their outer ends, whereby the plants will be chopped to a stand by the forward movement of the machine, as will be hereinafter fully described.

In the accompanying drawings, A represents two wheels, which are made with wide rims to prevent them from sinking into the soil, and of such a size that their axle B will pass over the plants without injuring them. The axle B is made of such a length that the wheels A will pass upon opposite sides of and close to the row of plants.

To the axle B are attached the handles C, by means of which the chopper is guided and controlled. Upon the inner side of one of the wheels A is formed, or to it is attached, a gear-wheel, D, the teeth of which mesh into the teeth of a small gear-wheel, E, attached to or formed upon the shaft F. The rear end of the shaft F revolves in a bearing in the rear end of the arched bar G and in the forward side of the axle B. The forward end of the shaft F revolves in a bearing in the forward part of the arched bar G. The rear end of the arched bar G is securely attached to the forward side of the axle B, and its forward part or arm, H, extends down to the ground, is curved forward and upward, to serve as runners to slide upon the ground and support the forward part of the machine. The forward part of the arched bar G is slotted or forked, so that the two parts or runners will pass along the opposite sides of a row of plants, the said slot or fork being made so wide and extending up so high as to pass over the plants without injuring them.

To the shaft F, or to a hub attached to the said shaft, are attached the inner ends of two radial arms, I, to the outer ends of which are attached the chopping-hoes J. The chopping-hoes J are formed of metal plates of a length equal to the length of the space to be left between the hills of plants in the row. The outer parts of the plates or hoes J are bent forward, so that their outer or cutting edges will be about at right angles with the inner parts of the said hoes, as shown in Fig. 3, and will thus be in proper position to chop the plants.

With this construction, as the machine moves forward, the hoes J will be revolved and will chop the plants to a stand, the number of plants left for each hill being regulated by the relative sizes of the wheels D E.

With this construction, also, the runners H will serve as guards to prevent the soil around the plants left for a stand from being broken away by the action of the hoes J.

Having thus fully described my invention, what I claim as new, and desire to secure by Letters Patent, is—

1. The combination, with the wheels, axle, and bar G, having runners H H, of the chopper-shaft F, journaled at the front in said bar and at the rear in said axle, as shown and described.

2. The combination, with the wheels, axle, and handles A B C, of the gear-wheels D E, the shaft F, carrying the hoe-arms I, and the arched bar G, carrying in front the runners H H, as and for the purpose specified.

JOHN HECTOR BETHUNE.

Witnesses:
WILLIAM DREWRY SMITH,
ANDREW JACKSON BRANNAN.